US009175396B2

(12) United States Patent
Bauer et al.

(10) Patent No.: US 9,175,396 B2
(45) Date of Patent: Nov. 3, 2015

(54) ALUMINUM-CONTAINING SUBSTRATE COMPRISING A MICROPOROUS LAYER OF AN ALUMINUM PHOSPHATE ZEOLITE, METHOD FOR THE PRODUCTION THEREOF, AND USE THEREOF

(75) Inventors: Jürgen Bauer, Lichtenfels (DE); Ralph Herrmann, Halle (DE); Wilhelm Schwieger, Spardorf (DE); Abhijeet Avhale, Amsterdam (NL)

(73) Assignee: SorTech AG, Halle (Saale) (DE)

( * ) Notice: Subject to any disclaimer, the term of this patent is extended or adjusted under 35 U.S.C. 154(b) by 780 days.

(21) Appl. No.: 12/736,807

(22) PCT Filed: May 13, 2009

(86) PCT No.: PCT/EP2009/003408
§ 371 (c)(1),
(2), (4) Date: Apr. 1, 2011

(87) PCT Pub. No.: WO2009/138223
PCT Pub. Date: Nov. 19, 2009

(65) Prior Publication Data
US 2011/0183836 A1    Jul. 28, 2011

(30) Foreign Application Priority Data

May 15, 2008  (DE) ......................... 10 2008 023 634

(51) Int. Cl.
| | | |
|---|---|---|
| B01J 29/06 | (2006.01) | |
| B01J 27/182 | (2006.01) | |
| C23C 18/12 | (2006.01) | |
| B01J 29/85 | (2006.01) | |
| B01J 29/83 | (2006.01) | |
| B01J 35/10 | (2006.01) | |
| B01J 37/02 | (2006.01) | |

(52) U.S. Cl.
CPC ............. *C23C 18/1212* (2013.01); *B01J 29/83* (2013.01); *B01J 29/85* (2013.01); *C23C 18/1225* (2013.01); *C23C 18/1241* (2013.01); *C23C 18/1254* (2013.01); *B01J 35/10* (2013.01); *B01J 35/109* (2013.01); *B01J 35/1057* (2013.01); *B01J 37/0215* (2013.01); *B01J 37/0244* (2013.01); *B01J 37/0246* (2013.01); *B01J 2229/62* (2013.01); *B01J 2229/66* (2013.01)

(58) Field of Classification Search
USPC ......... 502/60, 63, 64, 67, 71, 77, 79, 69, 208, 502/214, 527.12, 527.13, 66, 73, 74
See application file for complete search history.

(56) References Cited

U.S. PATENT DOCUMENTS

| | | | | |
|---|---|---|---|---|
| 2003/0091872 | A1 | 5/2003 | Yan | ................................ 428/702 |
| 2009/0090491 | A1 | 4/2009 | Schwieger et al. | ........... 165/133 |

FOREIGN PATENT DOCUMENTS

| | | | | |
|---|---|---|---|---|
| DE | 10304322 | 11/2004 | ............. | B01D 67/00 |
| DE | 102004041836 | 3/2006 | ............. | C04B 41/85 |
| JP | 2005-289735 | 10/2005 | ............. | B01D 69/04 |
| JP | 2005-534605 | 11/2005 | ............. | B01D 53/86 |
| WO | WO 96/01686 | 1/1996 | ............. | B01D 71/02 |
| WO | WO 2004/013042 | 2/2004 | ............. | C01B 21/20 |
| WO | WO 2006/048211 | 5/2006 | ............. | C23C 18/12 |

OTHER PUBLICATIONS

Official Communication from the Patent Office in China, a first Office Action, dated Mar. 9, 2012, for Chinese Patent Application No. 2009-801 234 38.6, with English translation thereof.
Official Communication from the Patent Office in China, a second Office Action, dated Jan. 5, 2013, for Chinese Patent Application No. 2009-801 234 38.6, with English translation thereof.
International Search Report (In English) dated Dec. 18, 2009 and the International Preliminary Report on Patentability (In German) dated Aug. 10, 2010.
Hartmann, Martin, "Hierarchical zeolites: a proven strategy to combine shape selectivity with efficient mass transport", Angewandte Chemie International Edition Engl. Nov. 12, 2004; 43(44): 5880-5882.
Office Action dated Jan. 24, 2014, issued by the Japanese Patent Office, for corresponding Japanese Patent Application No. JP 2011-508836, filed on May 13, 2009, and a computerized English translation thereof.

*Primary Examiner* — Elizabeth Wood
(74) *Attorney, Agent, or Firm* — Gerald T. Bodner

(57) ABSTRACT

An aluminum-containing substrate is described that comprises at least one superficially applied microporous layer of an aluminum phosphate zeolite (ALPO) as well as other layers. Said aluminum-containing substrate is characterized in that the microporous layer of the aluminum phosphate zeolite represents a primer coating on which a microporous or mesoporous secondary material is located which differs from the material of the primer coating. Said aluminum-containing substrate is produced in a particularly advantageous manner according to a method in which 1. an aluminum-containing substrate is hydrothermally treated in an aqueous suspension containing at least phosphorus as a network-forming element, and a microporous primer coating of an aluminum phosphate zeolite is formed on the substrate by means of an in situ crystallization process, especially the molar ratio between the network-forming aluminum that is deficient in the aqueous suspension and the sum of all network-forming elements in the aqueous suspension being less than 0.5 such that the aluminum required for compensating the deficiency is removed from the aluminum-containing substrate, and 2.; a microporous or mesoporous secondary material is formed on the microporous primer coating by subjecting the aluminum-containing substrate that comprises the microporous primer coating to another treatment in an aqueous suspension containing the network-forming elements required for forming the porous secondary material. The described aluminum-containing substrate is particularly suitable as a heat exchanger, as a catalytic reactor, or as a component in heat transformation technology with an anti-corrosive or anti-fouling effect.

19 Claims, 7 Drawing Sheets

(Comparison of X-ray diffractograms of the untreated Al carrier (above), the Al carrier with SAPO-34 primary layer, the Al carrier with SAPO-34 primary layer and MFI secondary material and, for comparison, values of a powdery MFI material)

(Electron microscope image of the SAPO-34 primary layer)

(Electron microscope image of the secondary material MFI on the SAPO-34 primary layer)

(Comparison of the X-ray diffractograms of a SAPO-34 primary layer on an Al carrier (bottom) and the ALPO-5 secondary material on this primary layer)

(Electron microscope image of the secondary material ALPO-5 on a SAPO-34 primary layer)

(Comparison of the X-ray diffractograms of a SAPO-18 primary layer on an Al carrier (bottom) and the SAPO-34 secondary material on this primary layer)

ALUMINUM-CONTAINING SUBSTRATE COMPRISING A MICROPOROUS LAYER OF AN ALUMINUM PHOSPHATE ZEOLITE, METHOD FOR THE PRODUCTION THEREOF, AND USE THEREOF

The invention relates to an aluminium-containing substrate with at least one superficially applied microporous layer of an aluminium phosphate zeolite (ALPO) and optionally further layers, a method for producing this coated aluminium-containing substrate and advantageous uses thereof.

Aluminium substrates of the type described above are known, for example, from US 2003/0091872 A1 (now, U.S. Pat. No. 6,849,568) and WO 2006/048211 A2. US 2003/091872A1 relates to a method for forming a layer of an aluminium silicate zeolite on a metal-containing substrate, which takes places by the use of aqueous synthesis suspensions for conventional aluminium silicate zeolites. After introducing an aluminium-containing substrate into the suspension, aluminium atoms of the substrate are partially incorporated in the zeolite network, so the adhesion of the zeolite layer on the substrate is improved. The Si and Al sources in the solution supply the building material for the zeolite layer to be formed, the sources having a stoichiometric relationship with one another. This known proposal is not satisfactory. According to this, layers of conventional aluminium silicate zeolites form during the crystallisation on aluminium-containing substrates but the anchoring thereof to the substrate is unsatisfactory. In contrast, the teaching according to WO 2006/048211 A2 leads to an improvement. This is also, in particular, a method for forming a zeolite layer on an aluminium-containing substrate. An aqueous suspension is produced, which comprises at least one network-forming element for the zeolite, the aluminium-containing substrate having at least one of the network-forming elements. The aluminium-containing substrate is also introduced into an aqueous suspension here, a zeolite layer forming on the substrate by in-situ crystallisation. The core of the invention according to WO 2006/048211 A2 is that at least one of the network-forming elements present in the aqueous suspension for the zeolite forming process and the end structure of the zeolite is stoichiometrically deficient. The molar ratio between the deficient network-forming element(s) in the aqueous suspension and the sum of all the network-forming elements present in the aqueous suspension is below 0.5. The deficient network-forming elements are taken from the aluminium-containing substrate and incorporated in the zeolite layer. One network-forming element is preferably phosphorous, which is present in the aqueous suspension. In a case such as this, an aluminium phosphate zeolite is formed on the substrate. In this case, the network-forming element may, for example, come from phosphoric acid or various ammonium phosphates.

It is therefore important for the technical proposal known from WO 2006/048211 A2 that at least one of the network-forming elements is present in the described aqueous suspension with a stoichiometric deficiency. Diverse advantages result from this: thus, the zeolite layer formed on the aluminium-containing substrate exhibits reliable anchoring and very good adhesion. The orientation of the crystals runs substantially perpendicular to the surface of the aluminium-containing substrate. This particular orientation means a substantially uniform orientation of the crystals and ensures the uniform accessibility of reactants in the micropore system of the crystals produced of the zeolite layer.

Thus, the prior art outlined above is to be seen against the background of a "crystallisation" of a zeolite layer, in particularly an aluminium phosphate zeolite (ALPO). If "aluminium phosphate" and "ALPO" are referred to here, the substitution derivatives "SAPOs", "MeAPOs" and "MeSAPOs" should then simultaneously be included here.

No binders are used in the prior art shown above. This is advantageous. However, not all zeolites grow in this manner on the surface of the aluminium-containing substrate. In many cases, in particular in the aluminosilicates crystallising in the strongly alkaline medium, an uncontrollable dissolution reaction may occur, which leads to a destruction of the metal-containing substrate. Other zeolites only grow with difficulty directly on metallic or ceramic surfaces, because the composition, structure or the surface potential of these surfaces have a repelling effect on the molecular building units of the zeolites. The material transport within the zeolite layer is often the speed-limiting factor for the adsorption of molecules in catalysis, cleaning and adsorption processes as well as for material separation. If thicker layers are therefore required, a negative influence for the material transport into and out of the zeolite layer is then always produced from a critical layer thickness onward.

A further prior art in the present area emerges from WO 96/01686. This WO document firstly discloses a system with improved selective permeability of molecules. It is based on a substrate, a zeolite or zeolite-like layer, a coating improving the selectivity, which is in contact with the zeolite or zeolite-like layer, and optionally a permeable intermediate layer in contact with the substrate. The zeolite layer or zeolite-like layer is in contact with the substrate and/or the optionally provided intermediate layer. The coating may be permeable or impermeable. Permeable materials may have a porous structure, which transports the molecules, so they can pass through the zeolite. They may also be a simple material, which has a free volume that is sufficient to allow the molecules to pass through and then migrate through the zeolite. The preferred coating consists of a polyimide. Polyimide coatings or films, according to the disclosure of this WO document, have very low permeability for molecules of low hydrocarbons. Nevertheless, they should have adequate permeability and improve the selectivity. However, polyimides have the disadvantage that they would burn during the calcination possibly being considered. A further example of a coating of this type is silicon dioxide. This may also be permeable or non-permeable. The improvement in selectivity owing to the applied coating to specific portions of the zeolite layer is based on a purely physical blocking of undesired openings in the zeolite layer. An intrinsic functionality of a chemical character, owing to special material properties, which go beyond a simple, local transport blocking, is not achieved.

Obviously, it is not important for the material according to this prior art, what the type of substrate mentioned is to be. It may be porous or non-porous. It is preferably based on inorganic oxides or non-rusting steel. These may also be ceramic materials, metals, carbides, polymers and mixtures thereof. Furthermore, refractive oxides, aluminium oxide, titanium oxide, silicon oxide, silicon carbide, carbon, graphite, silicon nitride or mixtures thereof should be considered. Layers of any zeolites can then, in particular, be formed on a substrate of this type. Specifically and preferably, the aluminium silicate MFI is disclosed, in particular in the examples.

The invention was therefore based on the object of developing the aluminium-containing substrates designated at the outset with at least one superficially applied microporous layer of an aluminium phosphate zeolite (ALPO) and further layers in such a way that the mentioned drawbacks of material transport limitation (pressure loss) are eliminated or at least clearly reduced. Moreover, the formation of multiple layers to encourage particularly aimed for technical effects should be possible. A suitable method for producing an aluminium-containing substrate of this type coated in a defined manner is also to be proposed. Further advantageous use possibilities are also to be developed.

As the solution to this object, the invention proposes that the microporous layer of the aluminium phosphate zeolite is a primary layer, on which a microporous or mesoporous secondary material, which is different from the material of the primary layer, is located, closed or discontinuous.

Thus the invention differs from the above-described prior art, in particular, in that not only a zeolite layer is formed on the aluminium-containing substrate, but the differing microporous or mesoporous secondary material, closed or discontinuous, follows the designated primary layer. It is thus possible to crystallise zeolite types, which previously did not grow or only with great difficulty by direct crystallisation processes on a carrier layer significantly better and also without carrier dissolution, as layers. The teaching according to the invention in the abstractness shown leads to clear improvements or advantages compared to the prior art described. The microporous layer of the aluminium phosphate zeolite in the form of the primary layer shows a particularly advantageous rigid binding to the differing microporous or mesoporous secondary material, whether closed or discontinuous. This leads to better accessibility in thicker and clearly more stably anchored zeolite layers on the respective aluminium-containing substrate. Finally, the invention allows an extended zeolite selection in the production of binder-free zeolite layers. Thus, materials are also accessible as a layer of the type which would dissolve the carrier material in direct crystallisation or which only have a very slight inclination to crystallisation on the surfaces thereof. An improved flexibility in the control of the properties of layers made of microporous materials is also achieved by the combination, on the one hand, of the microporous layer of the aluminium phosphate zeolite as the primary layer and, on the other hand, the designated secondary material. The crystallisation of many types of zeolite on the aluminium-containing substrate can be accelerated by the formation of the primary layer and carried out in milder conditions. In particular owing to the combination of zeolites of different pore widths, hierarchically constructed pore systems can be produced which allow particularly encouraged material transport (cf. Martin Hartmann, Agnew Chem. Int. Ed Engl. 2004 Nov. 12; 43(44):5880-2), i.e. these are hierarchical pore systems with a graded pore width.

The descriptions above show that both the microporous primary layer and the microporous or mesoporous secondary material, closed, thus for example in the form of a layer, or discontinuous, already per se have the function in the applications in which a material flow, in particular a gas flow is required, of allowing this. In the important applications, the type of secondary material substantially determines the desired function. Thus, one could refer here to a "functional porous secondary material" or a "functional microporous or mesoporous secondary material". Therefore, in the individual case, a "functional secondary material" is also referred to below, though this should not be regarded as a limitation in the technological sense.

Particularly advantageous configurations of the aluminium-containing substrate according to the invention will be shown below in detail.

DETAILED DESCRIPTION OF THE PREFERRED EMBODIMENTS

Figure 1:
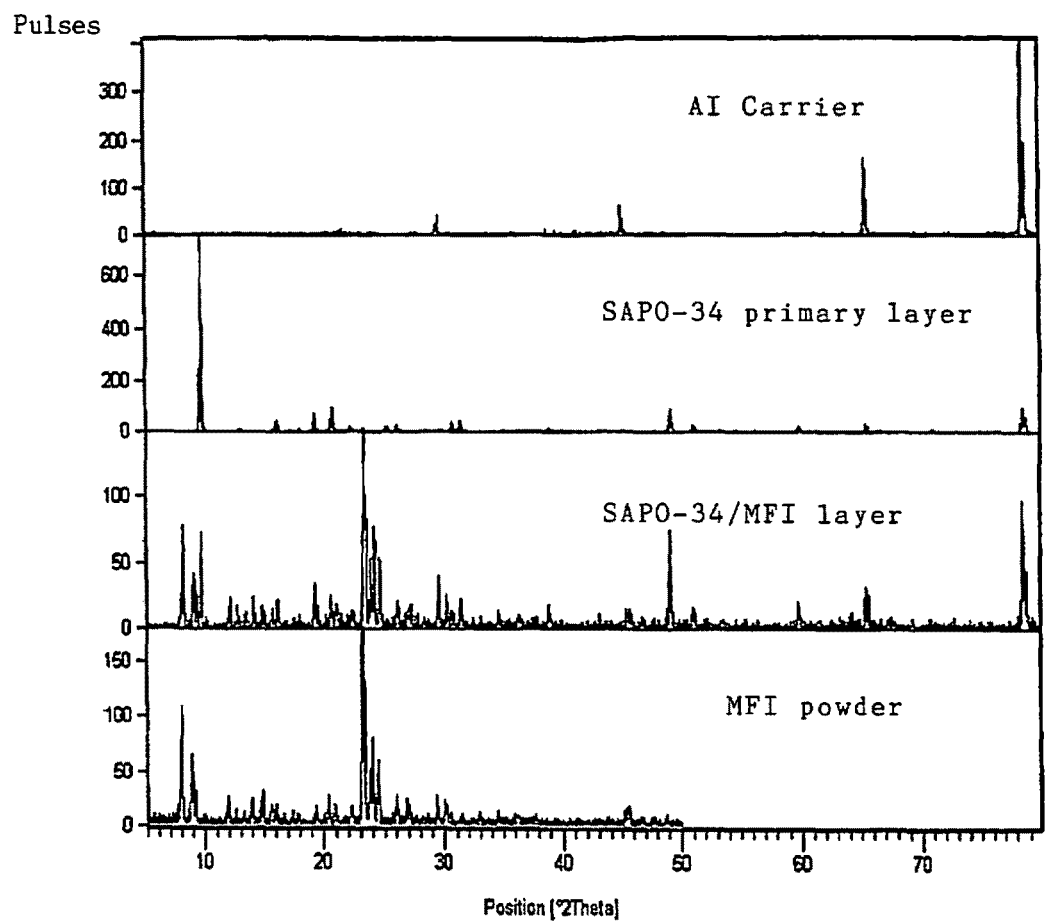
FIG. 1 is a graph which shows a comparison of X-ray diffractograms of an untreated Al carrier, the Al carrier with SAPO-34 primary layer, the Al carrier with SAPO-34 primary layer and MFI secondary material and, for comparison, values of a powdery MFI material.

The aluminium-containing substrate according to the invention has at least one superficially applied microporous layer of an aluminium phosphate zeolite (ALPO). These materials, in the sense of the invention, have the advantage that, in an in-situ crystallisation, their chemical composition cannot be changed by aluminium from the aluminium-containing substrate and, in addition, in the downstream formation process of the microporous or mesoporous secondary material, they do not influence the latter in an undesired manner by, for example, their own counterions. The aluminium-containing substrate is preferably aluminium, an aluminium-containing alloy, in particular a steel alloyed with aluminium, or an aluminium-containing ceramic, such as, in individual cases, aluminium oxide.

The functional secondary material important to the invention is microporous or mesoporous. The microporous or mesoporous secondary material is preferably present as ALPO, in particular as SAPO, MeAPO or MeSAPO, or, in general, in the form of zeolitic aluminosilicates or silicates, in particular as FAU, MFI, LTA, BEA, CHA. Closed, non-porous secondary materials with special functionality could likewise be applied but then hinder the material transport.

It is advantageous if the microporous primary layer has a mean pore diameter of less than about 2.0 nm, in particular less than 1.0 nm. It is particularly advantageous if the mean pore diameter is about 0.2 to 1.0 nm here, in particular about 0.3 to 0.7 nm. The mean pore diameter of the microporous primary layer is preferably smaller than that of the porous secondary material. However, in individual cases, it may also be expedient if the smaller pores are present in the secondary layer and the larger pores are present in the primary layer. Furthermore, it is advantageous if the mean pore diameter of the micropore is secondary material is about 0.4 to 1.5 nm, in particular about 0.5 to 1.3 nm. It is expedient if the mean pore diameter of the mesoporous secondary material is between about 2 and 5 nm, in particular about 2.5 and 4 nm.

The thickness of the primary layer and the closed or discontinuous layer of the microporous or mesoporous secondary material is not critically limited for the advantageous technical results aimed for by the invention. It has proven to be advantageous if the microporous primary layer has a thickness of at least about 1 μm and/or the microporous or mesoporous secondary material has a thickness of at least about 1 μm, in particular at least about 5 μm. Layer thicknesses below about 1 μm generally lead to discontinuous primary layers. Consequently, as stated, it is not imperative for the surface of the primary layer to be completely covered by the porous secondary material. In individual cases it is completely sufficient if a more or less discontinuous application took place. Generally it is sufficient if the surface covering in the discontinuous configuration is more than about 60%, in particular more than about 90%.

In the practical realisation of the invention, it has moreover proven to be advantageous if the microporous primary layer and the microporous or mesoporous secondary material have a difference either with respect to the chemical type of the porous materials, their porosity or the type and orientation of the pore system, in particular in the form of a gradually stepped porosity. When a gradually stepped porosity is referred to, this is to be understood, in particular, as follows. This is a "hierarchical" porosity, which is to encourage the material transport. Furthermore, the stepped porosity is characterised in that owing to an adapted pore width difference, a "funnel effect" occurs, which encourages the material transition from one pore system to the other. Owing to the stepped porosity, the material transport can take place better than in layers of equal thickness of the microporous layer of the aluminium phosphate zeolite and of the microporous or mesoporous secondary material, in particular in the form of a zeolite. The lattice composition, contained counterions or inclusions and hydrophilic properties and acidity of the material are given as examples with respect to the difference of the chemical type. A functional property of a chemical nature or a property exhibiting a chemical effect and going beyond purely physical, local transport blockings is also always connected therewith. The different porosity can advantageously be adjusted within the porosity framework shown above. With regard to the type and orientation of the pore system, it can be stated that the combination of two-dimensional pore channel systems with three-dimensional pore networks or a pore system preferably oriented perpendicular to the carrier surface in the secondary material on a primary layer with three-dimensional pore systems (3-D) allows advantageous diffusion properties.

In the individual cases it may be advantageous if a further material, to which a functionality can be attributed, as defined above, is formed on the microporous or mesoporous secondary material. In particular, this may be a functional porous material.

In this case, it is furthermore preferred if the microporous primary layer, the microporous or mesoporous secondary material and further applied porous materials have a gradually stepped porosity to encourage the diffusion behaviour during use. There are also applications in which it is expedient if the coated aluminium-containing substrate has an outer layer which fulfils the function of an anti-fouling layer. The flexibility of the aluminium-containing substrate according to the invention is shown in that, advantageously, the microporous primary layer and/or the porous secondary material can contain functionally acting substances and/or metal ions, in particular catalytically acting metal ions. Metal ions, such as platinum, palladium, ruthenium, iron, copper, cobalt, zinc or nickel ions, in particular, are preferred here.

Consequently, as a result, various functional coatings may open up different advantageous application possibilities such as, for example, for fouling protection, for heterogeneous catalysis, for material separation, also in conjunction with catalysis, for adsorption and material cleaning and energy conversion.

The aluminium substrate coated according to the invention, as shown above, exhibits particularly advantageous benefits when used as a heat exchanger, catalytic reactor or as a structural element in heat transformation technology or as a structural element with an anti-fouling effect.

The advantages which the aluminium-containing substrate according to the invention exhibits are in particular achieved when the method proposed by the invention is used for the production thereof.

This is a method for producing an aluminium-containing substrate of the type described above, wherein 1. an aluminium-containing substrate is hydrothermally treated in an aqueous suspension containing at least phosphorous as the network-forming element and a microporous primary layer of an aluminium phosphate zeolite is formed thereon by an in-situ crystallisation, the mol. ratio between the network-forming aluminium that is deficient in the aqueous suspension and the sum of all the network-forming elements present in the aqueous suspension being, in particular, below 0.5, so the required aluminium to compensate the deficiency is removed from the aluminium-containing substrate, and 2. a microporous or mesoporous secondary material is formed on the microporous primary layer in that the aluminium-containing substrate having the microporous primary layer is subjected to a further treatment in an aqueous suspension, which contains the required network-forming elements for forming the microporous or mesoporous secondary material.

The method shown under measure 1. of "deficiency technology" originates substantially from WO 2006/048211 already discussed at the outset, namely as a method teaching which has proved to be preferred therein. It can be seen here that to form the microporous layer of the aluminium phosphate zeolite (ALPO) in the aqueous suspension used, in which the aluminium-containing substrate is provided with a microporous primary layer, phosphorous is contained as the network-forming element. The phosphorous may be contained therein, for example, as phosphoric acid or as a phosphate, in particular in the form of water-soluble phosphates. Moreover, ammonium phosphates are in particular possible as the water-soluble phosphates.

If the aluminium phosphate zeolite (ALPO) is a zeolite, which, like, for example (SAPO) contains silicon, the aqueous suspension as the network-forming element also contains silicon. In this case, the silicon is supplied to the reaction solution in the form of silicic acid, silica sol, highly dispersed silicon oxide, such as, for example Aerosil, or in the form of a silicic acid ester. Moreover, a soluble silicate, such as sodium silicate, may also be supplied.

In individual cases, it may be advantageous to also use template compounds. These are structure-directing agents (SPA), such as, for example, alkyl or aryl ammonium salts, preferably phosphates here, or else surface active materials.

According to the given teaching of measure 1), the person skilled in the art is free to configure the latter such that the aluminium emerges either completely from the aluminium-containing substrate or else partially from the suspension as a network-forming element. The feature "the required network-forming elements" to form the porous secondary material is therefore sufficient information for the person skilled in the art. This also emerges from the context of the present description of the invention, as, in particular, also from the following example.

This method can be particularly advantageously developed in that the mol. ratio of the deficient network-forming aluminium and the sum of all the network-forming elements contained in the suspension is below 0.2, in particular below 0.1. Moreover it is advantageous if the aqueous suspension which is used to form the respective layers or the material to be applied is adjusted to a temperature of about 50 to 250° C., in particular to about 80 to 200° C.

The method according to the invention is particularly advantageously developed in that a further functional porous material, which was already dealt with above by way of example, is applied to the microporous or mesoporous secondary material or the layer thereof.

The following can be stated with regard to this functional porous material:

It should continue an existing grading of the pore widths, may preferably fulfil a protective function for the secondary material and prevent fouling and advantageously supplement the different chemical properties of the primary layer and secondary material.

With regard to further advantages of the invention:

The advantages of the invention are in particular to be seen in the fact that the combination of zeolites in layer form, owing to the method found according to the invention, succeeds firstly on the basis of aluminium phosphates with their high aluminium content (phosphate primary zeolites), which adhere very well to metallic aluminium or to other Al-containing carriers. The adhesion of the secondary material (for example second zeolite layer) on the primary layer is very strong owing to a great micro-roughness of the primary layer and the chemical similarity (OH end groups, aluminium tetrahedrons, possible silicate tetrahedrons). According to the invention, double and multiple layers of various zeolite types (for example aluminium silicate zeolite and aluminium phosphate zeolite) can be advantageously produced on an aluminium phosphate primary layer.

The product according to the invention shows various possibilities for use, which, in particular, originate from the following improvements compared to the prior art: different zeolite structures: aluminium phosphates and aluminium silicates on aluminium phosphates, including systems derived therefrom with further lattice ions; different pore radii (large and small pore opening), different pore volumes, different orientation of the crystals or the pore systems, linear pore systems and 3D pore systems; different hydrophilic properties, acidity, different post-synthetic modifications, ion exchange of different quantities and/or types of cations (metals); different morphology (large crystals or openings), closed layers of individual crystals with an open macrostructure or nanoparticles/crystallites and previously not producible zeolite layers as the secondary layer.

It appears expedient to also show the invention technologically with reference to the above statements: firstly, an ALPO, SAPO, MeAPO or MeSAPO primary layer (phosphate primary zeolite) can be formed on the aluminium-containing substrate. The invention preferably makes use here of consuming crystallisation. This is a method for rigid binderless growth of phosphate zeolites on the designated aluminium-containing substrates. This is then introduced into a further synthesis solution, which leads to the crystallisation of the functional porous secondary material, thus in the form of a second zeolite (secondary zeolite) on the surface of the phosphate primary layer. An advantageous suspension has a high tendency to heterogeneous nucleation, so the growth of the secondary material, in particular a secondary zeolite, takes place on the present primary layer with its large zeolitic surface. A particularly favourable uniform nucleation occurs.

It is advantageous to adjust the reaction and the material parameters of the second synthesis solution in such a way that no dissolution of the primary layer, no dissolution of the aluminium-containing substrate and no formation of free zeolite powder of the zeolite and crystallisation on the primary layer occurs. The crystallisation of the secondary zeolite is carried out, for example, by hydrothermal synthesis at temperatures of up to 250° C. The specific conditions in the production of the aluminium-containing substrate according to the invention vary depending on the pairing phosphate-primary zeolite/secondary zeolite and should, in each case, be accordingly adapted, which is to be carried out by the person skilled in the art in a skilled manner. An upstream nucleus deposition of the secondary zeolite on the primary layer is also expedient with clearly different primary and secondary zeolites.

Figure 7:
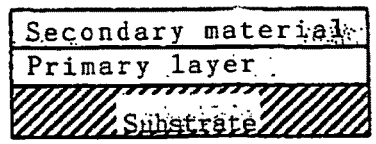
FIG. 7 is a schematic view of the composite of aluminium-containing substrate, the ALPO-based primary layer and the secondary material, formed in accordance with the present invention.
Figure 8:
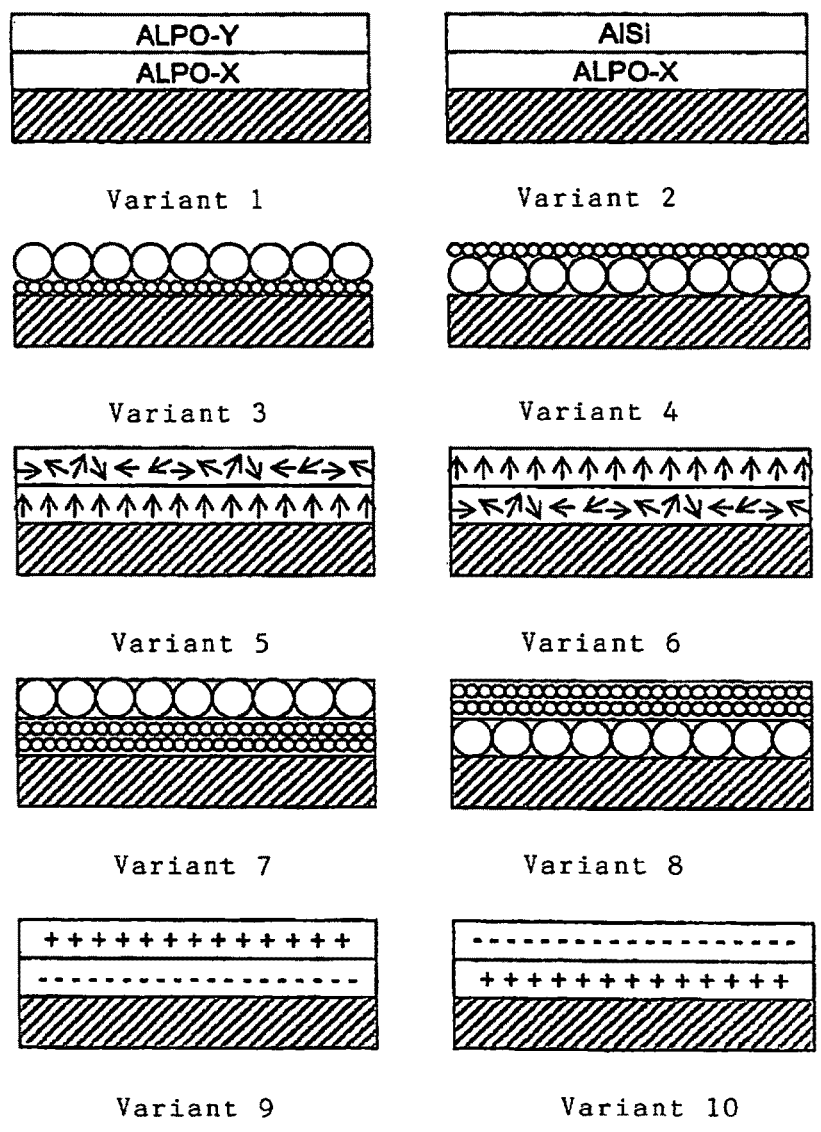
FIG. 8 is a schematic view of Variants 1-10 of realizable composites formed in accordance with the present invention by varying the properties of the primary layer and secondary material.

The invention described in detail above can be further described with the aid of the accompanying FIGS. 7 and 8: FIG. 7 relates to a schematic view of the composite of aluminium-containing substrate, the ALPO-based primary layer and the secondary material. FIG. 8 shows a schematic view according to the invention of realisable composites by varying the properties of the primary layer and secondary material, reference being made to FIG. 7 with respect to the individual layers or their significance. By applying a second secondary material, the following variations can be accordingly extended; microporous ALPO primary layer with porous 1) ALPO secondary material and 2) aluminium silicate or silicate secondary material; 3) primary layer consisting of smaller crystals and secondary material made of larger crystals and vice versa: 4) the individual crystals can, in each case, also grow together. 5) and 6): different orientation of the crystals or the pore systems (for example linear and three-dimensional pore systems). Grading of the pore diameter: into 7) smaller pore diameters in the primary layer and larger ones in the secondary material. In 8) the primary layer has the larger pore diameters. 9) and 10) symbolise different chemical properties (for example hydrophilic properties, acidity, counterions: type and quantity) in primary layer and secondary material.

The invention will be described in more detail below with the aid of various production examples, The abbreviations MFI (ZSM-5), AFI (ALPO-5), AEI (SAPO-18), and CHA (SAPO-34) designate zeolitic compounds according to the nomenclature of the International Zeolite Association IZA ("Atlas of Zeolite Frameworks", Ch. Baerlocher, L. B. McCusker, D. H. Olson, Elsevier, 2007).

EXAMPLE 1

MFI on SAPO-34

Synthesis of the primary layer: The production of SAPO-34 (CHA) primary layer took place by means of a partial transformation of an Al carrier by a hydrothermal treatment. An Al foil (thickness 160 µm, dimensions 6×8 cm, ~99% Al) was used as the Al carrier. The latter was put into an autoclave (40 ml) together with an aqueous synthesis solution, which contained the remaining network formers (phosphorous and silicon) and a structure-directing template (morpholine). The composition of the synthesis solution in oxide ratios was 1.0 $P_2O_5$:0.4 $SiO_2$:3.0 morpholine:70 $H_2O$. $H_3PO_4$ (85%) was used as the phosphorous source and silica sol (35%) was used as the Si source. The hydrothermal crystallisation took place for 48 h at 200° C. After 48 h of crystallisation time, the autoclave was cooled to room temperature. The coated carrier was then removed, washed with deionised water and dried for 12 h at room temperature.

Synthesis of the secondary layer: The crystallisation of the MFI secondary layer took place in two steps. Firstly, the coated layer was rubbed over silicalite-1 crystals. The surface of the SAPO-34 primary layer was thereby covered with MFI crystals, which can act as crystallisation nuclei for the secondary layer formation. The silicalite-1 nuclei were produced at 160° C. and with a 48 h crystallisation time proceeding from a reaction mixture with the following composition: 1.0 $SiO_2$:0.16 $TPA_2O$:29 $H_2O$. Tetraethyl orthosilicate was used as the silicon source and tetrapropyl ammonium hydroxide was used as the template.

The pretreated carrier was then put in an autoclave (40 ml) together with the reaction mixture for the crystallisation of ZSM-5 (MFI). The molar composition of the reaction mixture was 1.0 $SiO_2$ 0.0088 $Al_2O_3$:0.036 $K_2O$:0.056 $TPA_2OH$:111 $H_2O$. Tetraethyl orthosilicate was used as the silicon source and aluminium nitrate was used as the Al source and tetrapropyl ammonium bromide was used as the template. The hydrothermal crystallisation was carried out for 24 h and at 175° C. After a crystallisation time of 24 h, the autoclave is cooled to room temperature and the coated carrier removed, washed with deionised water and dried to 12 h at room temperature.

Figure 2:
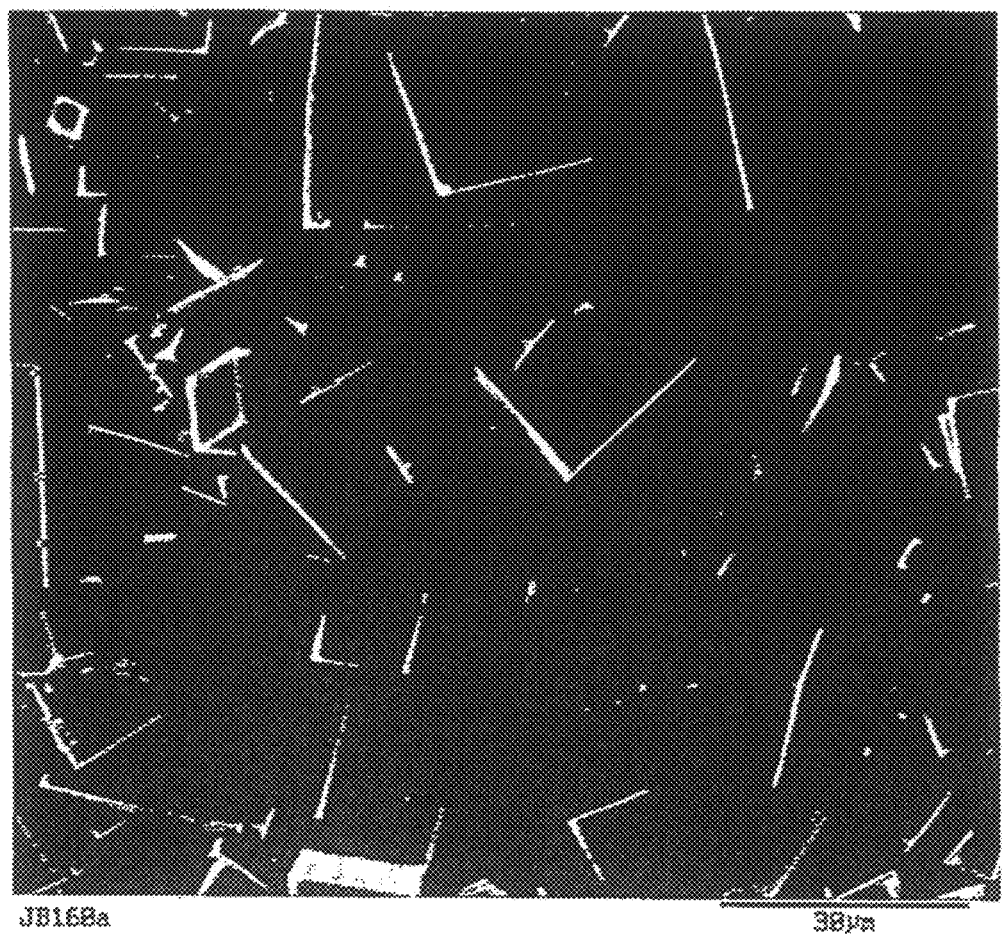
FIG. 2 is an electron microscope image of the Al carrier after formation of the primary layer and the secondary layer.
Figure 3:
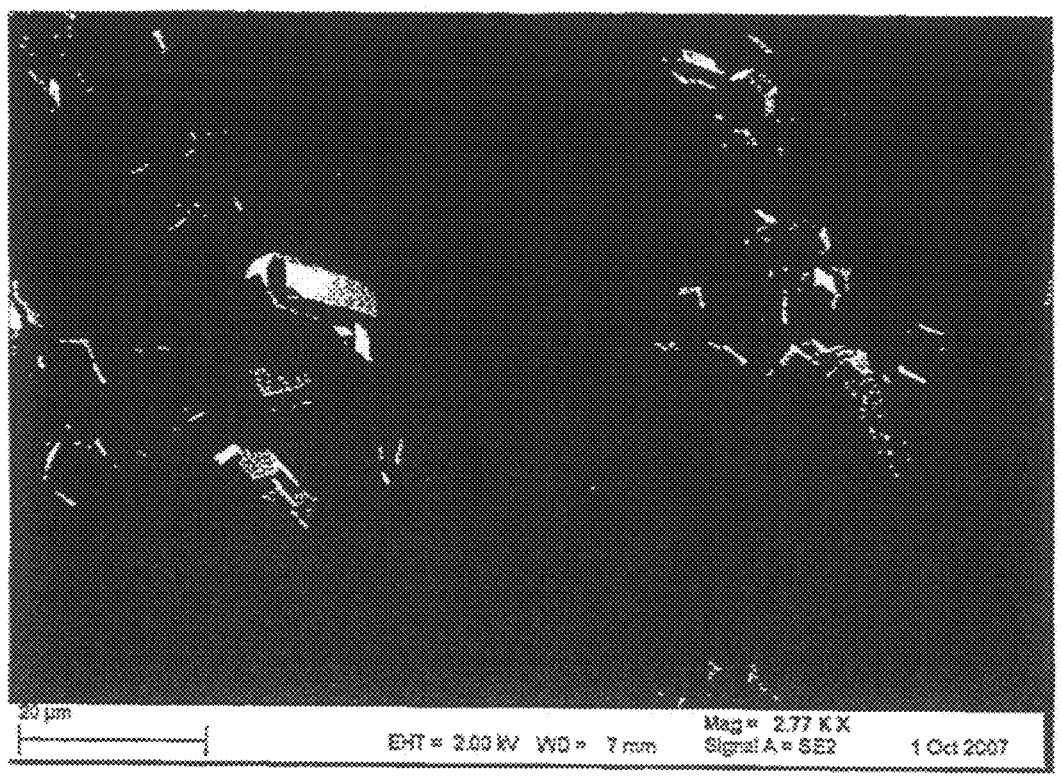
FIG. 3 is an electron microscope image of the secondary material on the primary layer of the Al carrier.

FIG. 1 shows the X-ray diffractograms of the Al carrier before and after the coating steps. In addition, the diffractogram of the ZSM-5 nucleus crystals is depicted. FIG. 2 shows an electron microscope image of the carrier after the primary layer and secondary layer formation. A image after the secondary layer formation can then be seen in FIG. 3. The formation of the SAPO-34 primary layer and the ZSM-5 secondary layer can clearly be shown with the diffractograms and the electron microscope images.

EXAMPLE 2

ALPO-5 (AFI) on SAPO-34 (CHA)

Synthesis of the primary layer: The SAPO-34 primary layer was produced by a partial transformation of an Al carrier by a hydrothermal treatment. An Al foil (thickness 160 µm, dimensions 6×8 cm, ~99% Al) was used as the Al carrier. This was put into an autoclave (40 ml) together with an aqueous synthesis solution, which contained the remaining network formers (phosphorous and silicon) and a structure-directing template (morpholine). The composition of the synthesis solution corresponded to 1.0 $P_2O_5$:0.4 $SiO_2$:3.0 morpholine: 70 $H_2O$. $H_3PO_4$ (85%) was used as the phosphorous source and silica sol (35%) was used as the Si source. The hydrothermal crystallisation took place for 48 h at 200° C. After 48 h crystallisation time, the autoclave was cooled to room temperature. The coated carrier was then removed, washed with deionised water and dried for 12 h at room temperature.

Synthesis of the secondary layer: The crystallisation of the ALPO-5 secondary layer took place by means of a second hydrothermal treatment of the coated Al carrier. For this purpose, a reaction batch was prepared with the following molar composition: 0.9 $Al_2O_3$:1.0 $P_2O_5$:1.0 TEA:50 $H_2O$. Pseudoboehmite was used as the Al source, $H_3PO_4$ was used as the phosphorous source and triethylamine was used as the template. The crystallisation of the secondary layer took place at 175° C. for 24 h in a 40 ml autoclave. The crystallisation was ended by cooling the autoclave to room temperature. The coated carrier was then removed from the autoclave, washed with deionised water and dried for 12 h at room temperature.

Figure 4:
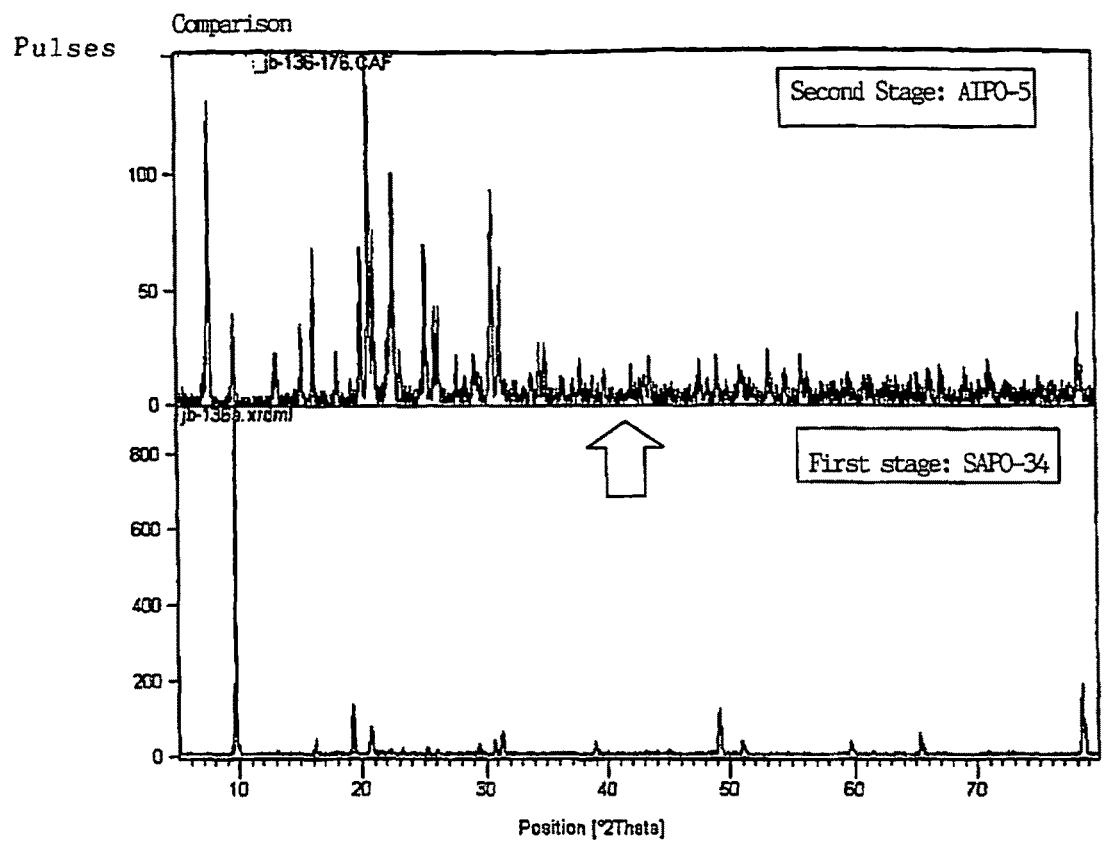
FIG. 4 is a graph which shows a comparison of the X-ray diffractograms of a SAPO-34 primary layer on an Al carrier (bottom) and the ALPO-5 secondary material on this primary layer.
Figure 5:
FIG. 5 is an electron microscope image of the ALPO-5 secondary layer.

FIG. 4 shows the X-ray diffractograms of the composite after primary and secondary layer formation and FIG. 5 shows an electron microscope image of the ALPO-5 secondary layer. The formation of the SAPO-34 primary layer and the ALPO-5 secondary layer can be shown with the aid of the diffractograms and the electron microscope images.

EXAMPLE 3

AFI on SAPO-18 (AEI)

Synthesis of the primary layer: The SAPO-18 primary layer was produced by means of a partial transformation of the Al carrier by a hydrothermal treatment. An Al foil (thickness 160 µm, dimensions 6×8 cm, ~99% Al) was used as the Al carrier. The latter was put into an autoclave (40 ml) together with an aqueous synthesis solution, which contained the remaining network formers (phosphorous and silicon) and a structure-directing template (diisopropylethylamine). The composition of the synthesis solution in oxide ratios was 1.0 $P_2O_5$:0.4 $SiO_2$:3.0 diisopropylethylamine:70 $H_2O$. $H_3PO_4$ (85%) was used as the phosphorous source and silica sol (35%) was used as the Si source. The hydrothermal crystallisation took place for 48 h at 175° C. After 48 h of crystallisation time, the autoclave was cooled to room temperature. The coated carrier was then removed, washed with deionised water and dried for 12 h at room temperature.

Synthesis of the secondary layer: The crystallisation of the SAPO-34 secondary layer took place by means of a second hydrothermal treatment of the coated Al carrier. For this purpose, a reaction batch was prepared with the following molar composition: 0.8 $Al_2O_3$:1.0 $P_2O_5$:0.4 $SiO_2$:3.0 morpholine: 70 $H_2O$. Pseudoboehmite was used as the Al source, $H_3PO_4$ was used as the phosphorous source, silica sol was used as the silicon source and morpholine was used as the template. The crystallisation of the secondary layer took place at 200° C. for 48 h in a 40 ml autoclave. After the cooling of the autoclave to room temperature, the coated carrier was removed from the autoclave, washed with deionised water and dried for 12 h at room temperature.

Figure 6:
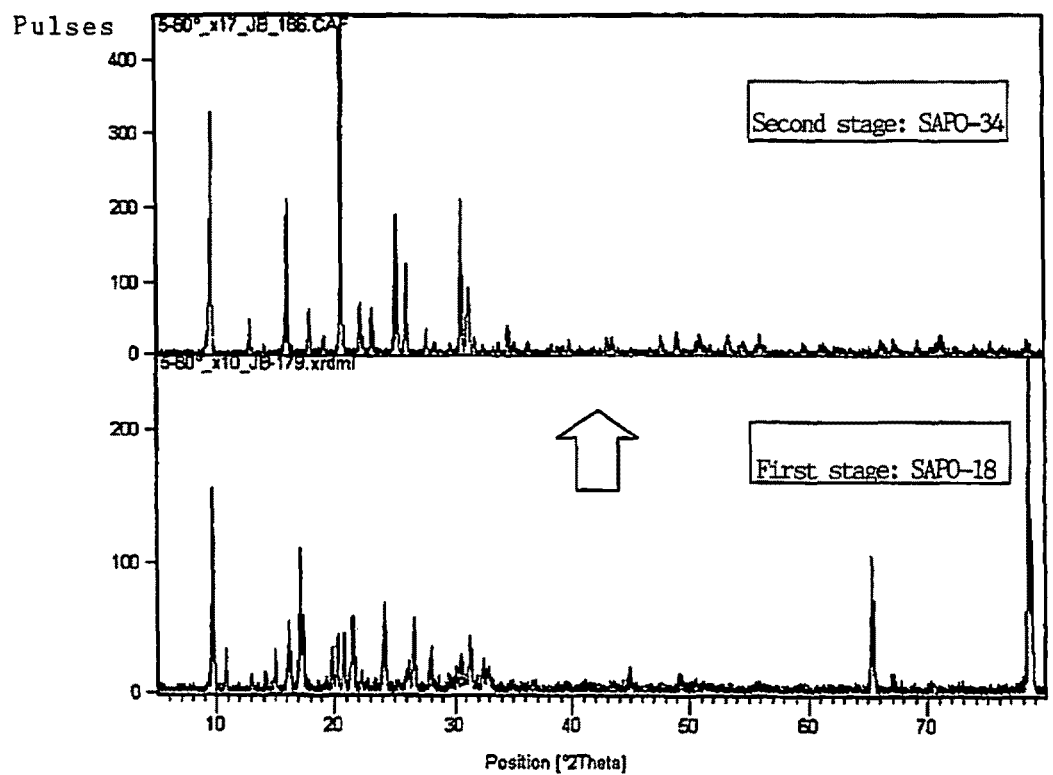
FIG. 6 is a graph which shows a comparison of the X-ray diffractograms of a SAPO-18 primary layer on an Al carrier (bottom) and the SAPO-34 secondary material on this primary layer.

FIG. 6 shows the X-ray diffractograms of the Al carrier after the primary and secondary layer formation. The formation of the SAPO-18 primary layer and the SAPO-34 secondary layer can be observed with the aid of the diffractograms.

The invention claimed is:

1. An aluminium-containing substrate with at least one superficially applied microporous layer of an aluminium phosphate zeolite (ALPO), characterised in that the microporous layer of the aluminium phosphate zeolite (ALPO) is a primary layer, and wherein the substrate further includes a microporous secondary material located on the primary layer of aluminium phosphate zeolite (ALPO), the microporous secondary material being different from the material of the primary layer, wherein the microporous primary layer and the microporous secondary material
   a) have a different gradually stepped porosity, wherein the microporous primary layer has a mean pore diameter of about 0.2 to 1 nm and the microporous secondary material has a mean pore diameter of about 0.4 to 1.5 nm, and
   b) show a difference with respect to the chemical type, wherein the microporous secondary material is present in the form of zeolitic silicates or aluminosilicates.

2. An aluminium-containing substrate according to claim 1, characterised in that the aluminium-containing substrate is based on aluminium, an aluminium-containing alloy or an aluminium containing ceramic.

3. An aluminium-containing substrate according to claim 1, characterised in that the aluminium-containing substrate is based on one of an aluminium-containing alloy which is a steel alloyed with aluminium, and an aluminium-containing ceramic.

4. An aluminium-containing substrate according to claim 1, characterised in that the aluminium phosphate zeolite (ALPO) is present as SAPO, MeSAPO or MeALPO.

5. An aluminium-containing substrate according to claim 1, characterised in that the mean pore diameter of the microporous primary layer is smaller than that of the microporous secondary material.

6. An aluminium-containing substrate according to claim 1, characterised in that the mean pore diameter of the secondary material is about 0.5 to 1.3 nm.

7. An aluminium-containing substrate with at least one superficially applied microporous layer of an aluminium phosphate zeolite (ALPO), characterised in that the microporous layer of the aluminium phosphate zeolite (ALPO) is a primary layer, and wherein the substrate further includes a mesoporous secondary material located on the primary layer of aluminium phosphate zeolite (ALPO), the mesoporous secondary material being different from the material of the primary layer, wherein the microporous primary layer and the mesoporous secondary material
   a) have a different gradually stepped porosity, wherein the microporous primary layer has a mean pore diameter of about 0.2 to 1 nm and the mesoporous secondary material has a mean pore diameter of about 2 to 5 nm, and
   b) show a difference with respect to the chemical type, wherein the mesoporous secondary material is present in the form of silicates, wherein the pore channel system of the layer of the mesoporous secondary material is oriented perpendicular to the carrier surface, resulting to a funnel effect, which encourages the material transition from one pore system to the other.

8. An aluminium-containing substrate according to claim 1, characterised in that the thickness of at least one of the microporous primary layer and the microporous secondary layer is at least about 1 μm.

9. An aluminium-containing substrate according to claim 1, characterised in that the aluminosilicates are one of FAU, MFI, LTA, BEA, and CHA.

10. An aluminium-containing substrate according to claim 1, which further comprises at least one further material having a gradually stepped porosity to encourage material transport during use, the at least one further material being one of closed and discontinuous, and being formed on the microporous secondary material and being based on a porous material.

11. An aluminium-containing substrate according to claim 10, characterised in that the microporous primary layer and the microporous secondary material have a gradually stepped porosity to encourage material transport during use.

12. An aluminium-containing substrate according to claim 1, characterised in that the aluminium-containing substrate has an outer layer on the top of the microporous secondary material which fulfils the function of an anti-fouling layer.

13. An aluminium-containing substrate according to claim 1, characterised in that at least one of the microporous primary layer and the microporous secondary material contains at least one of functionally acting substances and metal ions.

14. An aluminium-containing substrate according to claim 13, characterised in that the metal ions are selected from the group consisting of platinum, palladium, ruthenium, iron, copper, cobalt, zinc and nickel ions.

15. An aluminium-containing substrate according to claim 1, characterised in that the microporous primary layer has a mean pore diameter of about 0.3 to 0.7 nm.

16. An aluminium-containing substrate according to claim 13, characterised in that the at least one of the functionally acting substances and metal ions are present as catalytically active metal ions and protons.

17. An aluminium-containing substrate according to claim 1, characterized in that the silicates are alumino-silicates.

18. An aluminium-containing substrate according to claim 8, wherein the thickness of the microporous secondary material is at least about 5 μm.

19. An aluminium-containing substrate according to claim 7, characterised in that the mean pore diameter of the secondary material is about 3 to 5 nm.

* * * * *